W. D. BRACKETT.
ELECTRIC GAS IGNITER.
APPLICATION FILED MAR. 2, 1908.
922,081.
Patented May 18, 1909.
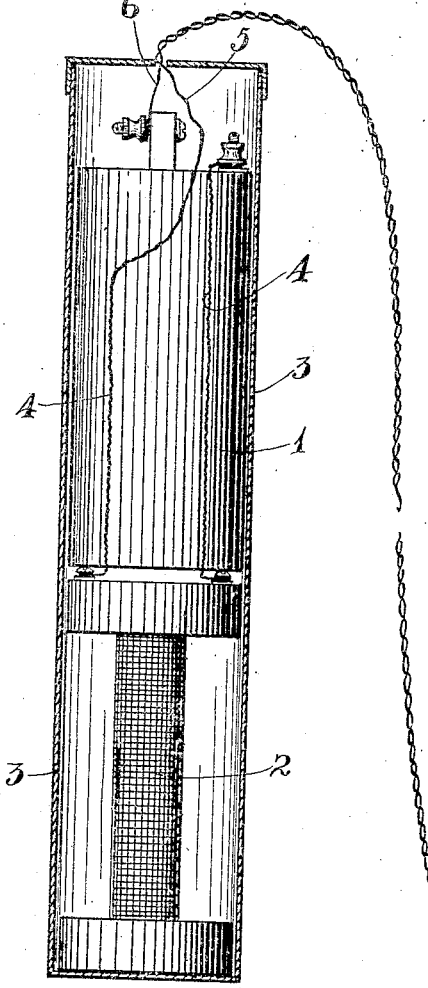
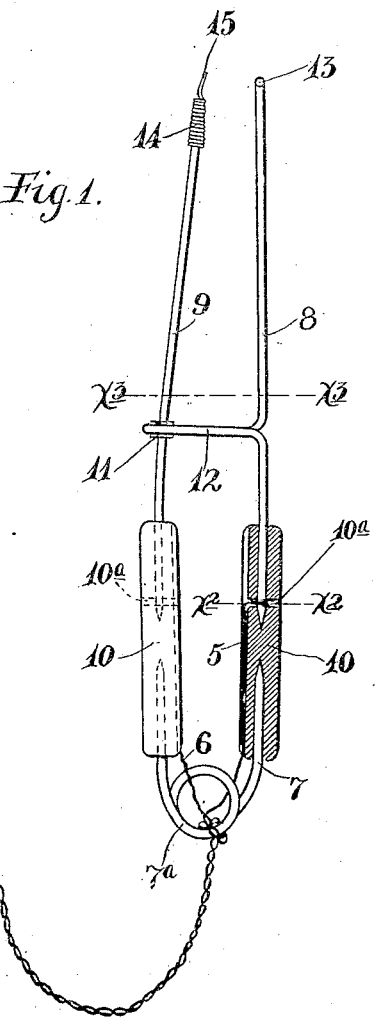
Fig. 1.
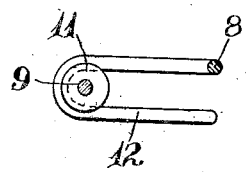
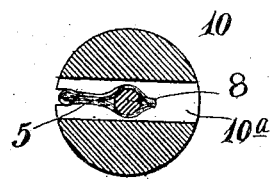
Fig. 3.   Fig. 2.
Witnesses.
Harry Opsahl.
H. D. Kilgore.
Inventor
William D Brackett.
By his Attorneys.
Williamson Merchant

UNITED STATES PATENT OFFICE.

WILLIAM D. BRACKETT, OF MINNEAPOLIS, MINNESOTA.

ELECTRIC GAS-IGNITER.

No. 922,081.   Specification of Letters Patent.   Patented May 18, 1909.

Application filed March 2, 1908. Serial No. 418,647.

*To all whom it may concern:*

Be it known that I, WILLIAM D. BRACKETT, a citizen of the United States, residing at Minneapolis, in the county of Hennepin and State of Minnesota, have invented certain new and useful Improvements in Electric Gas-Igniters; and I do hereby declare the following to be a full, clear, and exact description of the invention, such as will enable others skilled in the art to which it appertains to make and use the same.

My invention has for its object to provide a simple and inexpensive electric igniter, adapted for use to light gas and particularly adapted for use in connection with gas stoves.

To the above ends the invention consists of the novel devices and combinations of devices hereinafter described and defined in the claims.

In the accompanying drawings which illustrate the invention, like characters indicate like parts throughout the several views.

Referring to the drawings, Figure 1 is a view, partly in section and partly in elevation, showing the complete igniting apparatus. Fig. 2 is an enlarged section taken on the line $x^2$ $x^2$ of Fig. 1; and Fig. 3 is an enlarged section taken on the line $x^3$ $x^3$ of Fig. 1.

The source of electricity is preferably supplied by a battery cell 1 of the dry battery type and a sparking coil 2, which parts are placed within a portable casing 3. The terminals of the coil 2 are connected with the battery electrodes by wires 4 and the said battery electrodes are provided with leads 5 and 6, each of which leads is preferably made up, in the customary way, of a multiplicity of very fine wires, in cable form, covered with suitable insulation (not shown). The igniting device proper is adapted to be carried in the hand and is made up chiefly of three rods or wire members 7, 8 and 9. The member 7 is bent into approximately U-shape with a coil $7^a$ to give resilience thereto, and the ends of its prongs are sharpened and driven axially into the ends of handles 10 of insulating material and preferably of wood. The members 8 and 9 are also provided with sharpened ends that are driven axially into the said handles 10 and thus rigidly secured thereto. The member 9 in this preferred arrangement is provided with a small grooved roller 11 constructed of wood fiber, vulcanized rubber or other insulating material, and the member 8 is formed with a laterally bent guide loop 12 in which the said roller 11 works freely. The free end of the member 8 is bent laterally at 13 to form one member of a pair of wiping contacts. The coöperating wiping contact is formed from relatively small spring wire bent to form a coil 14 and a projecting spring finger portion 15. The said coil 14 tightly engages the free end of the member 9 and the spring finger 15 thereof is adapted to be wiped across the contact 13 when the members 8 and 9 are pressed together by gripping the two handles 10. In fact, when the handles 10 are forced together and then released and separated by the coil $7^a$, two sparks will be produced, the one by a movement of the spring finger 15 in one direction beyond the contact 13, and the other by return movement of the said spring finger.

The handles 10 are provided with small diametrical perforations $10^a$, through one of which the extended end of the lead 5 is passed, and through the other of which the extended end of the other lead 6 is passed. The electrical contact between the lead 5 and the member 8 and the lead 6 and the member 9 is made by forcing the sharpened ends of the said members 8 and 9 through the multiplicity of small wires that make up the said leads. It therefore of course follows that the extended ends of the leads should be in the perforations 10 when the sharpened ends of the said members 8 and 9 are driven into the respective handles. The handles 10, as is evident, insulate the two prong members 8 and 9 from each other.

The electric igniter above described has in practice been found highly efficient for the purposes had in view. It has also been found that it may be constructed at small cost.

What I claim is:

1. In an electric igniter comprising a pair of handles of insulating material, a spring yieldingly connecting said handles at one end, conducting rods driven into the other ends of said handles, and thereby insulated from each other, the said rods having coöperative wiping contacts at their free ends and one of said rods having a laterally extended guide loop and the other rod having a grooved member constructed of insulating material and worked in said loop, substantially as described.

2. An electric igniter comprising a pair of handles of insulating material, a spring yieldingly connecting said handles at one end, conducting rods driven into the other ends of said handles and thereby insulated from each other, the said rods having coöperating wiping contacts at their free ends and one of said rods having a laterally extended guide loop, and the other rod having a grooved wheel constructed of insulating material and working in said loop, substantially as described.

In testimony whereof I affix my signature in presence of two witnesses.

WILLIAM D. BRACKETT.

Witnesses:
H. D. KILGORE,
F. D. MERCHANT.